(12) United States Patent
Kent et al.

(10) Patent No.: US 7,787,520 B2
(45) Date of Patent: Aug. 31, 2010

(54) METHOD AND SYSTEM FOR CHANNEL ESTIMATION IN A SINGLE CHANNEL (SC) SINGLE-INPUT MULTIPLE-OUTPUT (SIMO) SYSTEM

(75) Inventors: Mark Kent, Vista, CA (US); Vinko Erceg, Cardiff, CA (US); Uri M. Landau, San Diego, CA (US); Pieter G. W. van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1462 days.

(21) Appl. No.: 11/173,964

(22) Filed: Jun. 30, 2005

(65) Prior Publication Data

US 2006/0072690 A1    Apr. 6, 2006

Related U.S. Application Data

(60) Provisional application No. 60/616,309, filed on Oct. 6, 2004.

(51) Int. Cl.
*H04B 1/00* (2006.01)
(52) U.S. Cl. .................. 375/148; 375/349; 342/174
(58) Field of Classification Search .......... 375/130, 375/136, 140, 141, 144, 147–148, 229–233, 375/259, 260, 316, 346, 349; 342/165, 173–174, 342/350, 368, 371–374; 455/403, 422.1, 455/450, 130, 296; 343/700 R, 753, 754
See application file for complete search history.

(56) References Cited

U.S. PATENT DOCUMENTS

| | | | | |
|---|---|---|---|---|
| 5,861,843 | A * | 1/1999 | Sorace et al. | 342/372 |
| 6,122,015 | A * | 9/2000 | Al-Dhahir et al. | 348/614 |
| 2001/0047424 | A1 * | 11/2001 | Alastalo et al. | 709/236 |
| 2002/0031167 | A1 * | 3/2002 | Hamamoto | 375/130 |

(Continued)

OTHER PUBLICATIONS

Jan Mietzner and Peter A. Hoeher, University of Kiel, Adaptive Antennas and MIMO Systems for Wireless Communications, *Boosting the Performance of Wireless Communication Systems: Theory and Practice of Multiple-Antenna Techniques*, IEEE Communications Magazine, Oct. 2004, pp. 40-47.

(Continued)

*Primary Examiner*—Shuwang Liu
*Assistant Examiner*—James M Perez
(74) *Attorney, Agent, or Firm*—McAndrews, Held & Malloy, Ltd.

(57) ABSTRACT

The method and system for channel estimation in a single channel (SC) single-input multiple-output (SIMO) system described herein may provide a fast and cost effective approach to concurrently determine propagation channel estimates in a single-transmit (1-Tx) and multiple-receive (M-Rx) antennas wireless communication system. A single weight baseband generator may comprise a set generator, a channel estimator, and an algorithm generator. The set generator may generate orthogonal function sequences that may be applied to the M receive antennas and may be utilized by the channel estimator to generate channels estimates. The orthogonal function sequences may be transferred to the channel estimator after a delay. The algorithm generator may generate phase values based on the channels estimates that may be applied to the M receive antennas to improve the system's signal-to-noise performance.

8 Claims, 6 Drawing Sheets

U.S. PATENT DOCUMENTS

| | | | |
|---|---|---|---|
| 2002/0181561 A1* | 12/2002 | Sano | 375/148 |
| 2003/0033337 A1* | 2/2003 | Iwasaki | 708/300 |
| 2004/0033791 A1* | 2/2004 | Schmidl et al. | 455/137 |
| 2005/0043052 A1* | 2/2005 | Whinnett et al. | 455/522 |
| 2005/0068990 A1* | 3/2005 | Liu | 370/516 |
| 2005/0088215 A1* | 4/2005 | Suissa et al. | 327/307 |
| 2005/0184906 A1* | 8/2005 | Nakaya et al. | 342/377 |
| 2005/0243898 A1 | 11/2005 | Reznik et al. | |

OTHER PUBLICATIONS

Simon Haykin, McMaster University; Mathini Sellathurai, Yvo de Jong, and Tricia Willink, Communications Research Centre Canada, Adaptive Antennas and MIMO Systems for Wireless Communications, *Turbo-MIMO for Wireless Communications*, IEEE Communications Magazine, Oct. 2004, pp. 48-53.

David J. Love, Purdue University, Robert W. Health Jr., University of Texas at Austin and Wiroonsak Santipach and Michael L. Honig, Northwestern University; Adaptive Antennas and MIMO Systems for Wireless Communications, *What is the Value of Limited Feedback for MIMO Channels?*, IEEE Communications Magazine, Oct. 2004, pp. 54-59.

Quentin H. Spencer, Distribution Control Systems, Inc., Christian B. Peel, Swiss Federal Institute of Technology, A. Lee Swindlehurst, Brigham Young University, Martin Haardt, Ilmenau University of Technology, Adaptive Antennas and MIMO Systems for Wireless Communications, *An Introduction to the Multi-User MIMO Downlink*, IEEE Communications Magazine, Oct. 2004, pp. 60-67.

Shahab Sanayei and Aria Nosratinia, University of Texas at Dallas, Adaptive Antennas and MIMO Systems for Wireless Communications, *Antennas Selection in MIMO Systems*, IEEE Communications Magazine, Oct. 2004, pp. 68-73.

Aria Nosratinia, University of Texas, Dallas, Todd E. Hunter, Nortel Networks, Ahmadreza Hedayat, University of Texas, Dallas, *Cooperative Communication in Wireless Networks*, IEEE Communications Magazine, Oct. 2004, pp. 74-80.

Jack H. Winters, *Optimum Combining for Indoor Radio Systems with Multiple Users*, IEEE Communications Magazine, vol. COM-35, No. 11, Nov. 1987, pp. 1222-1230.

$3^{rd}$ Generation Partnership Project; *Technical Specification Group Radio Access Network; Physical Layer Procedures (FDD) (Release 6)*, 3GPP TS 25.214 V6.2.0 (Jun. 2004), pp, 1-64.

* cited by examiner

METHOD AND SYSTEM FOR CHANNEL ESTIMATION IN A SINGLE CHANNEL (SC) SINGLE-INPUT MULTIPLE-OUTPUT (SIMO) SYSTEM

CROSS-REFERENCE TO RELATED APPLICATIONS/INCORPORATION BY REFERENCE

This patent application makes reference to, claims priority to and claims benefit from U.S. Provisional Patent Application Ser. No. 60/616,309 filed on Oct. 6, 2004.

This application makes reference to:
U.S. patent application Ser. No. 11/173,870 filed Jun. 30, 2005;
U.S. patent application Ser. No. 11/174,303 filed Jun. 30, 2005;
U.S. patent application Ser. No. 11/173,502 filed Jun. 30, 2005;
U.S. patent application Ser. No. 11/173,871 filed Jun. 30, 2005;
U.S. patent application Ser. No. 11/173,252 filed Jun. 30, 2005;
U.S. patent application Ser. No. 11/174,252 filed Jun. 30, 2005;
U.S. patent application Ser. No. 11/172,756 filed Jun. 30, 2005;
U.S. patent application Ser. No. 11/173,305 filed Jun. 30, 2005;
U.S. patent application Ser. No. 11/172,759 filed Jun. 30, 2005;
U.S. patent application Ser. No. 11/173,689 filed Jun. 30, 2005;
U.S. patent application Ser. No. 11/173,304 filed Jun. 30, 2005;
U.S. patent application Ser. No. 11/173,129 filed Jun. 30, 2005;
U.S. patent application Ser. No. 11/172,779 filed Jun. 30, 2005;
U.S. patent application Ser. No. 11/172,702 filed Jun. 30, 2005;
U.S. patent application Ser. No. 11/173,727 filed Jun 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005;
U.S. patent application Ser. No. 11/173,911 filed Jun. 30, 2005; and
U.S. patent application Ser. No. 11/174,043 filed Jun. 30, 2005.

The above referenced applications are hereby incorporated herein by reference in their entirety.

FIELD OF THE INVENTION

Certain embodiments of the invention relate to the processing of wireless communication signals. More specifically, certain embodiments of the invention relate to a method and system for channel estimation in a single channel (SC) single-input multiple-output (SIMO) system.

BACKGROUND OF THE INVENTION

In most current wireless communication systems, nodes in a network may be configured to operate based on a single transmit and a single receive antenna. However, for many of current wireless systems, the use of multiple transmit and/or receive antennas may result in an improved overall system performance. These multi-antenna configurations, also known as smart antenna techniques, may be utilized to reduce the negative effects of multipath and/or signal interference may have on signal reception. Existing systems and/or systems which are being currently deployed, for example, CDMA-based systems, TDMA-based systems, WLAN systems, and OFDM-based systems such as IEEE 802.11 a/g, may benefit from configurations based on multiple transmit and/or receive antennas. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process. Such diversity gains improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers. Accordingly, N signals may be simulataneously transmitted in the same bandwidth using N transmit antennas, with the transmitted signal then being separated into N respective signals by way of a set of N antennas deployed at the receiver. Systems that utilize multiple transmit and multiple receive antenna may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3 dB increase in SNR.

However, the widespread deployment of multi-antenna systems in wireless communications, particularly in wireless handset devices, has been limited by the increased cost that results from increased size, complexity, and power consumption. The necessity of providing a separate RF chain for each transmit and receive antenna is a direct factor in the increased the cost of multi-antenna systems. Each RF chain generally comprises a low noise amplifier (LNA), a filter, a downconverter, and an analog-to-digital converter (A/D). In certain existing single-antenna wireless receivers, the single required RF chain may account for over 30% of the receiver's total cost. It is therefore apparent that as the number of transmit and receive antennas increases, the system complexity, power consumption, and overall cost may increase.

One factor that adds to the complexity, and which may affect the performance of multiple receive antenna configurations, is the need to determine or estimate separate propagation channels. A simple method may comprise switching to a first receive antenna utilizing, for example, an RF switch, and estimate a first propagation channel. After estimating the first propagation channel, another receive antenna may be selected and its corresponding propagation channel may be estimated. In this regard, this process may be repeated until all the channels have been estimated. However, switching between receive antennas may disrupt the receiver's modem and may lower throughput. Moreover, this approach may require additional hardware and may also result in propagation channel estimates at different time intervals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for channel estimation in a single channel (SC) single-input multiple-output (SIMO) system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for channel estimation in a single channel (SC) single-input multiple-output (SIMO) system. The performance of a wireless communication system comprising a first receive antenna and additional receive antennas may be improved when the radio frequency (RF) phase of the received signal at each of the additional receive antennas is aligned with the signal at the first receive antenna resulting in a maximizing of the received via diversity gain. The present invention may achieve the improved performance that results from diversity gain with minimal added complexity and without the requirement of an RF channel for each of the receive antennas.

This approach may be based on periodically initiating a learning process where the RF phase of the signal at each antenna is estimated. The signal at each antenna may then be aligned based on the RF phase estimate. The receive antennas may be operatively connected to phase-shifters for modifying the phase of the received signals. During the learning mode operation, the front-end portion of the wireless receiver may generate a set of orthogonal sequences (orthogonal functions) that are based on a sequence of RF phase-shift. Each function in the sequences modulates the channel response of an associated receive antenna. The set of the channel response of the receiver antennas becomes to be orthogonal set (during the learning period) This method may produce a low complexity means that enables it to measure the channel response of each antenna. The measured channel response associated with an antenna may be utilized to calculate an estimate for its signal RF phase. The estimates may then be applied to the receive antennas by utilizing the phase-shifters in a manner that optimizes the received signal power. The measurement process may be performed periodically in order to follow the channel responses changes.

Figure 1:
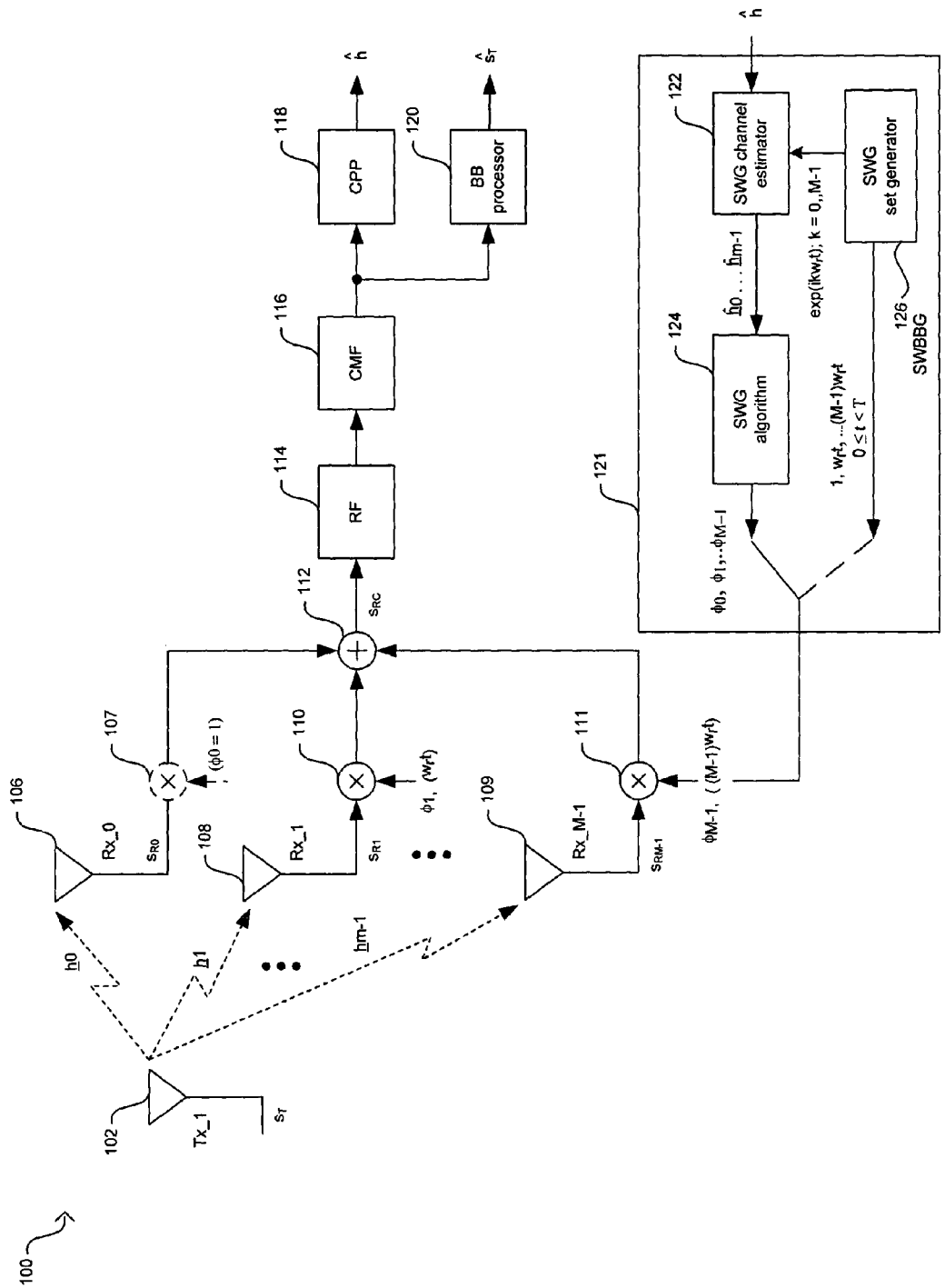
FIG. 1 is a block diagram of an exemplary single-transmit (1-Tx) antenna and two-receive (2-Rx) antennas wireless communication system with receiver channel estimation, in accordance with an embodiment of the invention.

FIG. 1 is a block diagram of an exemplary single-transmit (1-Tx) antenna and two-receive (2-Rx) antennas wireless communication system with receiver channel estimation, in accordance with an embodiment of the invention. Referring to FIG. 1, a wireless communication system 100 may comprise a single transmit antenna (Tx_0) 102, a first receive antenna (Rx_0) 106, additional receive antennas (Rx_1) 108 to (Rx_M−1) 109, a first phase shifter 107, (M−1) phase-shifters 110 to 111, an adder 112, an RF processing block 114, a chip matched filter (CMF) 116, a cluster path processor (CPP) 118, a baseband (BB) processor 120, and a single weight baseband generator (SWBBG) 121. In this regard, M may refer to the total number of receive antennas in the wireless communication system 100. The SWBBG 221 may comprise a single weight generator (SWG) channel estimator 122, a SWG algorithm block 124, and a SWG set generator 126.

The first receive antenna Rx_0 106 and the (M−1) additional receive antennas Rx_1 108 to Rx_M−1 109 may each receive a portion of the SC communication signals transmitted by the transmit antenna Tx_1 102. For example, the receive antenna Rx_0 106 may receive signal $s_{R0}$, the receive antenna Rx_1 108 may receive signal $s_{R1}$, and the receive antenna Rx_M−1 109 may receive signal $s_{RM-1}$. The propagation channels that correspond to the paths taken by the SC communication signals received by the receive antennas Rx_0 106 to Rx_M−1 109 may be represented by $h_0$ to $h_{M-1}$ respectively. In this regard, $h_0$ to $h_{M-1}$ may represent the time varying impulse responses of the RF paths taken by the portion of the transmitted SC communication signals received by the receive antennas Rx_0 106 to Rx_M−1 109 respectively. In many communication networks, the transmitter may be adapted to periodically transmit calibration and/or pilot signals that may be utilized to estimate the channel response.

The channel response of the first receive antenna 106 is considered as the reference channel response. The phase-shifter 107 shown communicatively coupled to Rx_106 may not be implemented circuitry and may be utilized to illustrate the mathematical relations that may occur between the phase shifters. When implemented as part of the wireless communication system 100, phase-shifter 107 may comprise suitable logic and/or circuitry that may be adapted to operate as a complex multiplier that may modify the phase of the portion of the SC communication signals received by the receive antenna Rx_1 106. The (M−1) phase-shifters 110 to 111 may comprise suitable logic and/or circuitry that may be adapted to operate as a complex multiplier that may modify the phase of the portion of the SC communication signals received by the receive antennas Rx_2 208 to Rx_M 209 via a rotation waveforms $\exp(jw_{r1}t)$ to $\exp(jw_{r(M-1)}t)$, where $w_{rk}=2\pi f_{rk}$ and $f_{rk}$ is the rotation frequency that preserves the orthogonality of the received signals at the multiple receiving antennas Rx_1 206 to Rx_M 209. The rotation frequency that preserves the signal orthogonality at the receiving antennas may be selected as $f_{rk}=kf_r$ where k=0, 1, 2, 3 . . . M−1. Other rotation waveforms such as triangular or square waveforms may be utilized with the same frequency relationships. In addition, waveforms representing different orthogonal codes of the same frequency may be utilized, similar to the CDMA orthogonal codes with the same spreading. In this regard, the following exemplary sequences may be utilized: the first receive antenna Rx_1 206 may utilize the sequence [1 1 1 1], the second receive antenna Rx_2 208 may utilize the sequence [−1 −1 1 1], a third receive antenna (Rx_3) may utilize the sequence [−1 1 −1 1], and so on. In this embodiment, $\exp(jw_{rk}t)$ is used as an exemplary waveform.

The adder 112 may comprise suitable hardware, logic, and/or circuitry that may be adapted to add the output of the phase-shifters 110 to 111 and the output of the Rx_1 106 to generate a combined received SC communication signal, $s_{RC}$, or gain balanced point. The output of the adder 112 may be transferred to the RF block 114 for further processing of the combined received SC communication signal, $s_{RC}$. The RF block 114 may comprise suitable logic and/or circuitry that may be adapted to process the combined received SC communication signal, $s_{RC}$. The RF block 114 may perform, for example, filtering, amplification, and/or analog-to-digital (A/D) conversion operations. The CMF 116 may comprise suitable logic, circuitry, and/or code that may be adapted to operate as a matched-filter on the digital output from the RF block 114. The output of the CMF 116 may be transferred, for example, to the CPP 118 and/or to the BB processor 120 for further processing. The BB processor 120 may comprise suitable logic, circuitry, and/or code that may be adapted to digitally process the filtered output of the CMF 216 to determine an estimate of the transmitted SC communication signals, $\hat{s}_T$.

The CPP 118 suitable logic, circuitry, and/or code that may be adapted to determine a baseband combined channel estimate, $\hat{h}$, which may comprise a combination, for example, a super-position, of the signal paths received by the receive antennas Rx_0 106 to Rx_1 109. In this regard, the baseband combined channel estimate, $\hat{h}$, generated by the CPP 118, may model the receiver antennas as one antenna. U.S. application Ser. No. 11/173,854 provides a detailed description of the processing of received signals by the CPP 118 and is hereby incorporated herein by reference in its entirety.

The channel response estimate provided by the CPP 118, which represents a complex vector, may be partitioned into a set of channel response estimates, that is, a set of complex vectors, associated with the receive antennas Rx_1 106 to Rx_M−1 109. For example, the propagation channel or channel response of antenna Rx_0 106, $h_0$, is estimated by $\hat{h}_0$, while the propagation channel or channel response of antenna Rx_1 108, $h_1$, is estimated by $\hat{h}_1$. Generally $\hat{h}_0$ to $\hat{h}_{M-1}$ are the estimates of the propagation channels $h_0$ to $h_{M-1}$, that correspond to the receive antennas Rx_0 106 to Rx_M−1 109. The channel that corresponds to the first receive antenna Rx_0 106 may be utilized as a reference channel. The determination of propagation channels $h_1$ to $h_{M-1}$, may utilize $h_0$ as a reference. This approach results in the use of M−1 phase-shifters in a wireless communication system with M receive antennas.

The SWG set generator 126 may comprise suitable logic, circuitry, and/or code that may be adapted to generate an orthogonal sequence set that may be utilized by the SWG channel estimator 122 and/or by the phase-shifters 110 to 111. The SWG channel estimator 122 may comprise suitable logic, circuitry, and/or code that may be adapted to process the baseband combined channel estimate, $\hat{h}$, generated by the CPP 118 and may determine the propagation channel estimates $\hat{h}_0$ to $\hat{h}_{M-1}$. The SWG algorithm block 124 may comprise suitable logic, circuitry, and/or code that may be adapted to utilize the measured channel responses to generate signals that may be utilized by the phase-shifters 110 to 111 to modify or rotate the portions of the transmitted SC communication signals received by the additional receive antennas Rx_1 108 to Rx_M−1 109 in a manner that may align the RF signals phases in the receive antennas Rx_106 to Rx_M−1 109. The result of this approach is to increase the received power, that is, the signal-to-noise ratio (SNR). The SWG algorithm block 124 may also comprise at least one analog to digital converter (A/D) that may convert the calculated numeric phase values into appropriate voltage levels that may be applied to the phase-shifters.

Figure 2A:
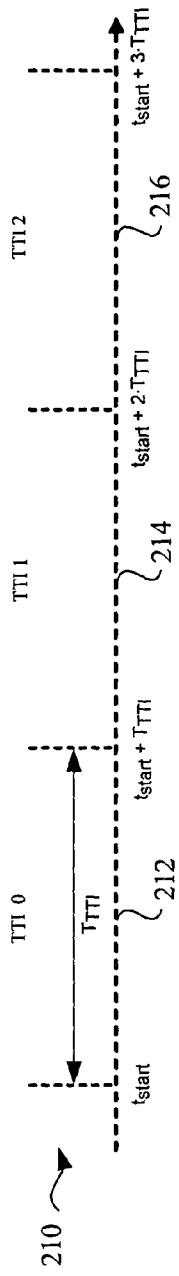
FIGS. 2A-2B illustrate exemplary time intervals utilized in channel estimation, in accordance with an embodiment of the invention.
Figure 2B:
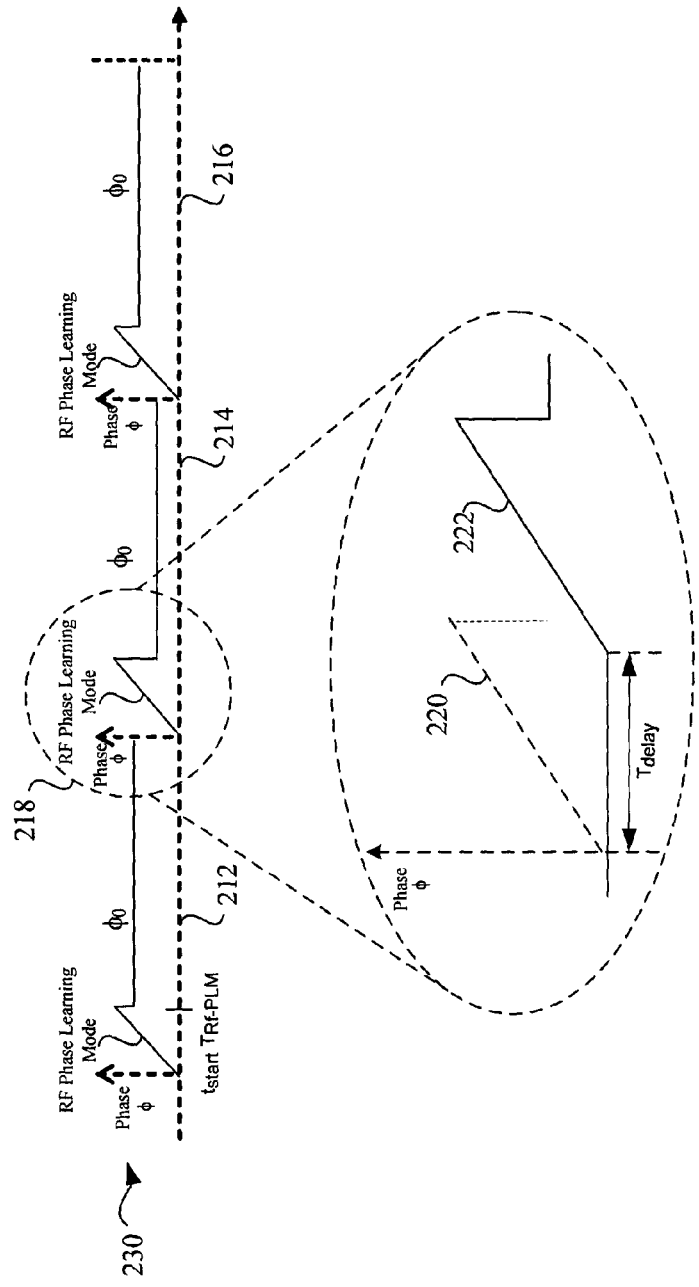

FIGS. 2A-2B illustrate exemplary time intervals utilized in channel estimation, in accordance with an embodiment of the invention. Referring to FIG. 2A, there is shown a signal diagram 210 that corresponds to a portion of a receiving data time interval and that may be divided into equal transmit time intervals (TTI). For example, a first transmit time interval may be labeled TTI0 212, a second transmit time interval may be labeled TTI1 214, and a third transmit time interval may be labeled TTI2 216. A transmit time interval may have a time duration or period $T_{TTI}$. The start of TTI0 212 may be indicated by time instance $t_{start}$. The start of TTI1 214 may be indicated by time instance $t_{start}+T_{TTI}$. The start of TTI2 216 may be indicated by time instance $t_{start}+2\cdot T_{TTI}$. The end of TTI2 216, which may correspond to the beginning of the next transmit time interval, may be indicated by time instance $t_{start}+3\cdot T_{TTI}$.

Referring to FIG. 2B, a signal diagram 230 indicates operations that may occur during a transmit time interval. For example, the front-end portion of a wireless receiver may begin or start an RF phase learning (RF-PLM) operation at time instance $t_{start}+n\cdot T_{TTI}$, where n corresponds to the TTI under consideration in the signal diagram 230. In this regard, signal diagram 230 comprises the exemplary transmit time intervals described in FIG. 2A. The RF-PLM operation may have a duration or period given by $T_{RF-PLM}$. During the RF-PLM portion of a TTI, a set of 0 to M−1 orthogonal functions may be generated by the SWG set generator 126 and may be applied to the received signals $s_{R1}$ to $s_{RM-1}$ using the phase-shifters 110 to 111 in FIG. 1. Hadamard sequences, for example, may be utilized during the RF-PLM operation. In an exemplary embodiment of the invention, for a front-end portion of a receiver comprising four receive antennas (M=4), the first receive antenna Rx_1 106 may utilize the sequence [1 1 1 1], the second receive antenna Rx_2 108 may utilize the sequence [−1 −1 1 1], and the Mth receive antenna Rx_M may utilize the sequence [−1 1−1 1]. In another embodiment of the invention, a set of orthogonal functions or sequences may be, for example, $\exp(ikw_r t)$, where k=0 to M−1 and t=0 to T-1, where T may correspond to the duration of the RF-PLM operation in a transmit time interval.

During the RF-PLM operation, the combined channel response estimate generated by the CPP 118, $\hat{h}(t)$, may be transferred to the SWG channel estimator 122. In this regard, the SWG channel estimator 122 may project the value of $\hat{h}(t)$ onto each of the orthogonal members in the orthogonal function set, generating the channel response for the receive antennas Rx_1 106 to Rx_M 109. At the end of the RF-PLM operation, the channels estimates may be transferred to the SWG algorithm 124 and the SWG algorithm 124 may generate phase shifts $\{\phi_i\}$, where i=0 to M−1, that may optimize the signal-to-noise ratio (SNR) of the receiver. For each of the received signals in the additional receive antennas, $s_{Ri}$, where i=1 to M−1, a phase correction may be applied through the phase-shifters 110 to 111. The ouputs of the phase-shifters 110 to 111 and the phase-shifter 107 may then be combined by the adder 112.

Various parameters, for example, the orthogonal function set, may be selected to optimize the wireless communication system performance. When a receiver is being utilized in a geometrically static operation or at a slow moving speed, for example, about 6 Km/hour, the RF-PLM operation may be performed at a slower rate than when a receiver is being utilized in a moving car, for example. When the operation of the wireless communication system is such that the reception, in terms of SNR, is not optimal, the RF-PLM may be performed for a limited time. In other instances, such as when communications are packet-based, for example in High Speed Downlink Packet Access (HSDPA) networks, the RF-PLM operation may be performed during periods when no data is being transmitting because a reference channel, such as in HSDPA applications, is being continuously transmitted. In some instances, the RF-PLM operation need not be enabled in each TTI in a received signal sequence. In this regard, the RF-PLM operation may be performed continuously or periodically, in accordance with various embodiments of the invention.

In some instances, there may exist a time mismatch in a signal path that starts at an output of the SWG set generator 126 in FIG. 1, and passes through the phase-shifters 110 to 111, the adder 112, the RF processing block 114, the CMF 116, the CPP 118, and ends at an input to the SWG channel estimator 122 and a direct signal path between an output of the SWG set generator 126 and an input to the SWG channel estimator 122. Referring to FIG. 2B, in one embodiment of the invention, a time compensation operation may be employed as shown by a delay in the RF-PLM operation described in inset of the region 218. For example, the RF-PLM operation may be delayed by a time delay $T_{delay}$ to compensate for the signal path difference. As shown, a signal 220 may correspond to the start of the RF-PLM operation in the TTI without a time delay and a signal 222 may correspond to the start of the RF-PLM operation in the TTI with a time delay T. For example, an orthogonal sequence set that may be utilized as input to the phase-shifters 110 to 111 may be applied at a time instance $t_{start}+n \cdot T_{TTI}$ to the phase-shifters 110 to 111, while the orthogonal sequence set may be applied to SWG channel estimator 122 at a time instance $t_{start}+3 \cdot T_{TTI}+T_{delay}$, providing a manner to achieve a time match between the two signal paths that originate at the SWG set generator 126 and are received by the SWG channel estimator 122.

In another embodiment of the invention, an orthogonal set may be transferred to the SWG channel estimator 122 directly after a sufficiently long delay that compensates for signal path differences. In this regard, when an orthogonal set is based on a set described by $\exp(iw_r kt)$, where k=0 to M−1, for example, orthogonality may be maintained between two members of the set even when one of them is delayed, provided that the inner product between the two inputs to the SWG channel estimator 122 is determined over a phase change of N×2pi, where N is an integer. In this regard, a phase correction of $kw_r \cdot T_{delay}$, where k=0 to M−1, may be applied to compensate for the calculated phases $\{\phi_0, \ldots, \phi_m\}$. The operation of the SWG channel estimator 122 may require the existence of a time match between the input ĥ generated by the CPP 118 and the input generated by the SWG set generator 126.

Figure 3:
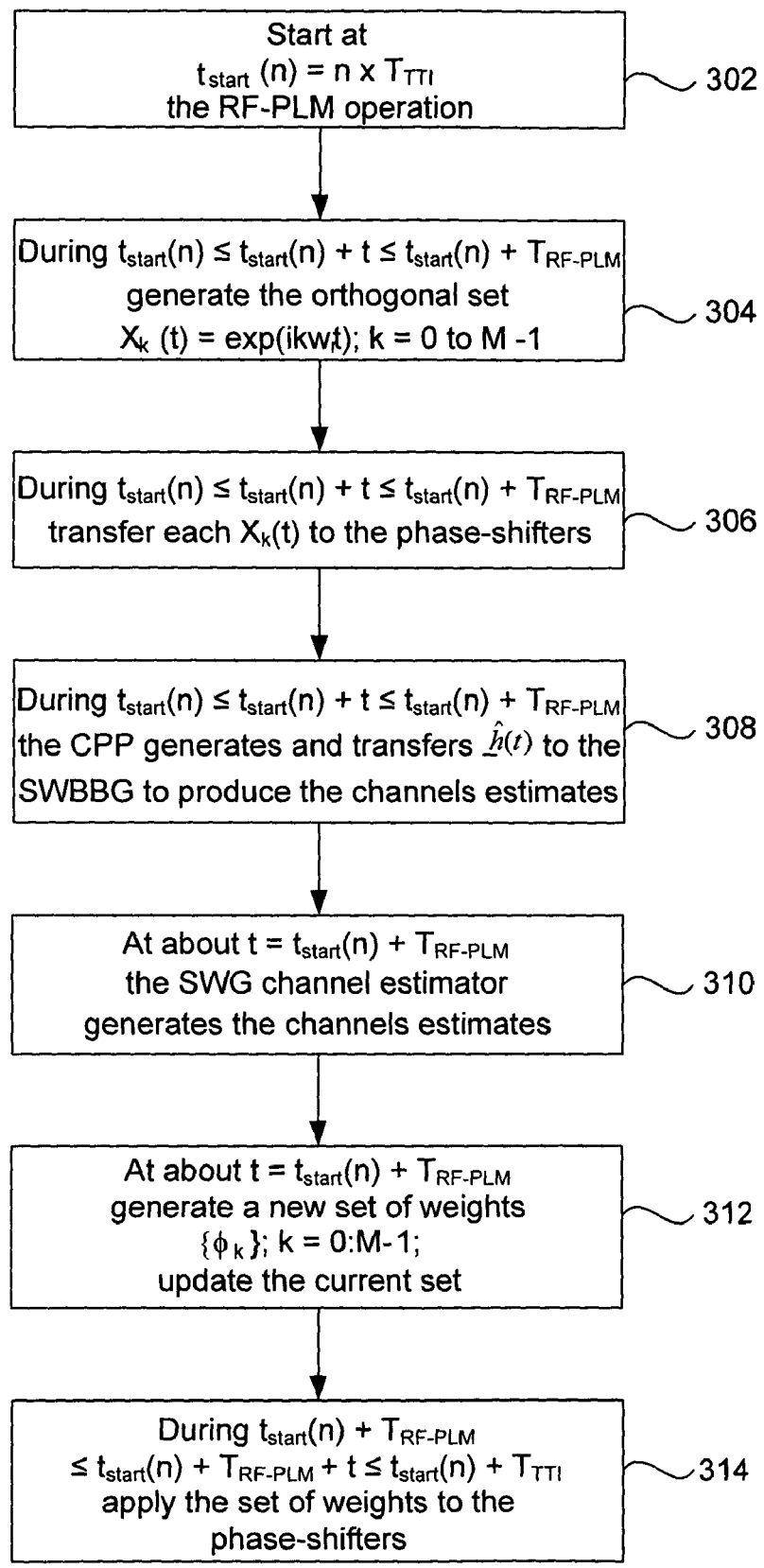
FIG. 3 is a flow diagram illustrating exemplary steps for channel estimation in a 1-Tx and M-Rx antennas wireless communication system, in accordance with an embodiment of the invention.

FIG. 3 is a flow diagram illustrating exemplary steps for channel estimation in a 1-Tx and M-Rx antennas wireless communication system, in accordance with an embodiment of the invention. Referring to FIG. 3, in step 302, the RF-PLM operation may be started for a transmit time interval at the appropriate time instances, for example, at $t_{start}(n)=n \cdot T_{TTI}$, where n corresponds to the time interval number and $T_{TTI}$ corresponds to the transmit time interval duration. In step 304, the SWG set generator 126 in FIG. 1 may generate an orthogonal sequence set, for example, $X_k(t)=\exp(ikw_r t)$, where k=0 to M−1 and $t_{start}(n) \leq t < T_{RF-PLM}$, and where the sequences $\{X_k(t)\}$ may be generated for the period $T_{RF-PLM}$ that corresponds to the duration of the RF-PLM operation. Step 304 may occur during the time interval described by $t_{start}(n) \leq t_{start}(n)+t \leq t_{start}(n)+T_{RF-PLM}$, where $t_{start}(n)$ corresponds to the start of a transmit time interval. In step 306, the SWG set generator 126 may apply the sequences to the phase-shifters 110 to 111. Accordingly, the RF phases at each of the additional receive antennas Rx_1 108 to Rx_M−1 109 may be modified based on the sequences generated by the SWG set generator 126.

In step 308, the combined channel response estimate, ĥ(t), may be modified by the phase changes generated in step 306 and may be transferred from the block CPP 118 to the SWG channel estimator 122. The SWG channel estimator 122 may utilize the value of the modified combined channel response estimate to produce new or updated channel estimates for antennas Rx_1 106 to Rx_M−1 109. In step 310, the SWG channel estimator 122 may generate a new set of channel estimates, $ĥ_k(t)$, where k=0 to M−1. Step 310 may generally occur at the end of the RF-PLM operation, that is, at about $t=t_{start}(n)+T_{RF-PLM}$, where $T_{RF-PLM}$ corresponds to the time interval necessary to complete the RF phase learn period. In step 312, the SWG algorithm 124 in FIG. 1 may generate, based on the updated channel estimates, a new set of channel weights, $\{\phi_k\}$, where k=0 to M−1. Step 312, may generally occur at the end or after the end of the RF-PLM operation, that is, at about $t=t_{start}(n)+T_{RF-PLM}$. In step 314, the generated weights, $\{\phi_k\}$, where k=0 to M−1, may be applied to the phase-shifters 110 to 111 at a time instance in the range $t_{start}(n)+T_{RF-PLM} \leq t_{start}(n)+T_{RF-PLM}+t \leq t_{start}(n)+T_{TTI}$.

Figure 4:
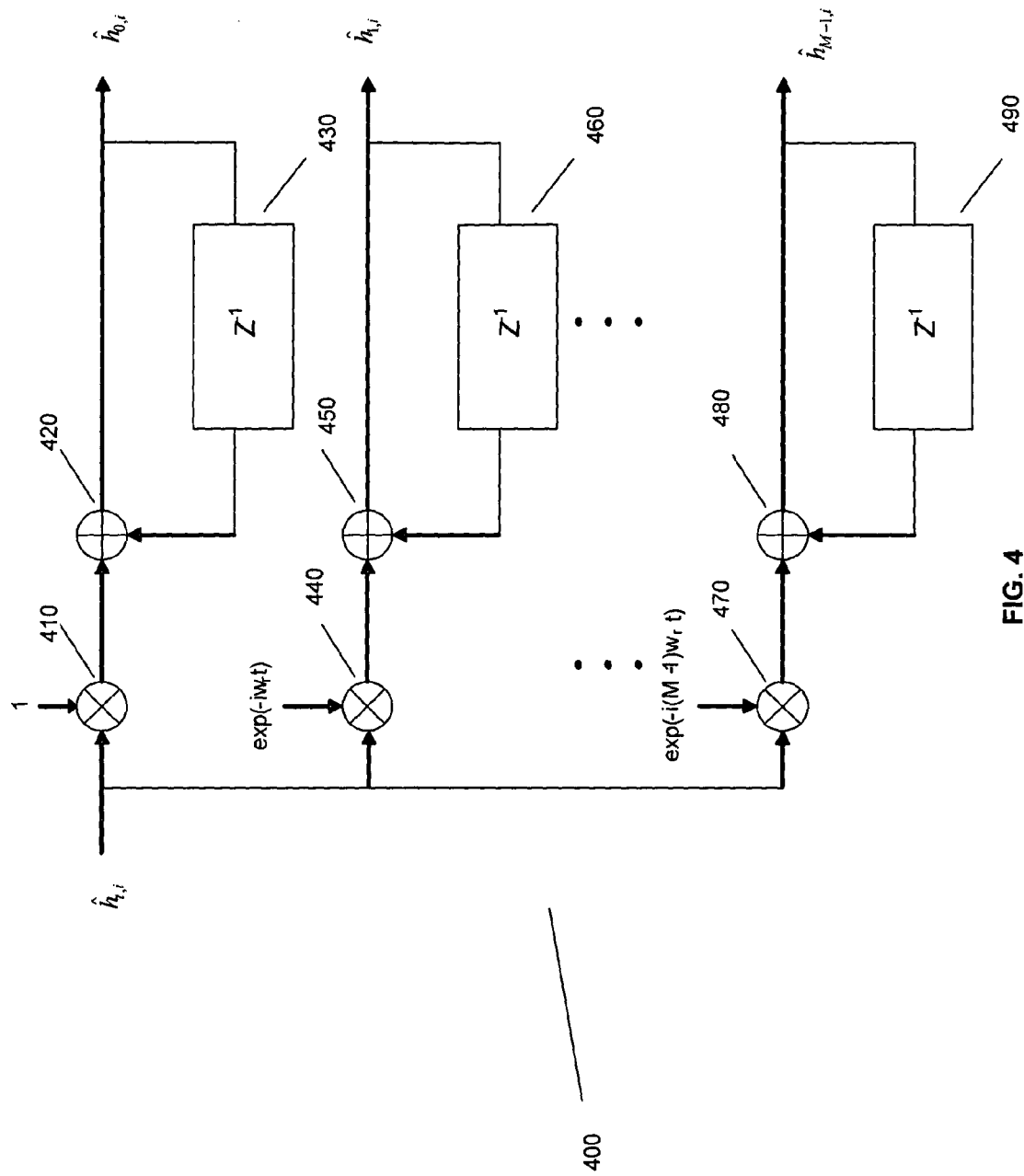
FIG. 4 is a block diagram of exemplary channel estimators, in accordance with an embodiment of the invention.

FIG. 4 is a block diagram of exemplary channel estimators, in accordance with an embodiment of the invention. Referring to FIG. 4, there is shown a system 400 that may correspond to a portion of the SWG channel estimator 122 in FIG. 1. The system 400 may comprise complex multipliers 410, 440, to 470, adders 420, 450, to 480, and registers 430, 460, to 490. The input to the system 400, $ĥ_{t,i}$, corresponds to the channel response of a path i at a time t during the RF-PLM operation, where the path i corresponds to a path processed by the CPP 118. For each path i, the system 400 operates as a digital frequency transform (DFT) that projects the input vector, $ĥ_{t,i}$, over a set of complex harmonic functions. In this regard, the complex multipliers 410, 440, to 470 may comprise suitable logic, circuitry, and/or code that may be adapted to weight the input vector with a set of weights $\{\exp(iw_r kt)\}$. The adders 420, 440, to 480 may comprise suitable logic, circuitry, and/or code that may be adapted to accumulate the weighted components generated by the complex multipliers 410, 440, to 470. The registers 430, 460, to 490 may comprise suitable logic, circuitry, and/or code that may be adapted to store a current sum generated by the adders 420, 440, to 480 and may be feed back the stored current sum to the adders 420, 440, to 480 after a delay. The system 400 may generate values $\{\hat{h}_{k,i}\}$ that correspond to the contribution of antenna k, where k=0 to M−1, to a received path i. The operation may be repeated for the whole set of paths i, where i=0 to L−1, and where L corresponds to the CPP 118 cluster size, that is, the number of path the CPP 188 may be adapted to handle.

In accordance with an embodiment of the invention, at the end of the RF-PLM operation, the generated set of complex harmonic functions $\{\hat{h}_{k,i}\}$, where k=0 to M−1 and i=0 to L−1, may be transferred to the SWG algorithm 124. In this regard, the SWG algorithm block 124 may generate a single weight (SW) for the phase-shifters 110 to 111 based on the weighted sum of the L paths.

Figure 5:
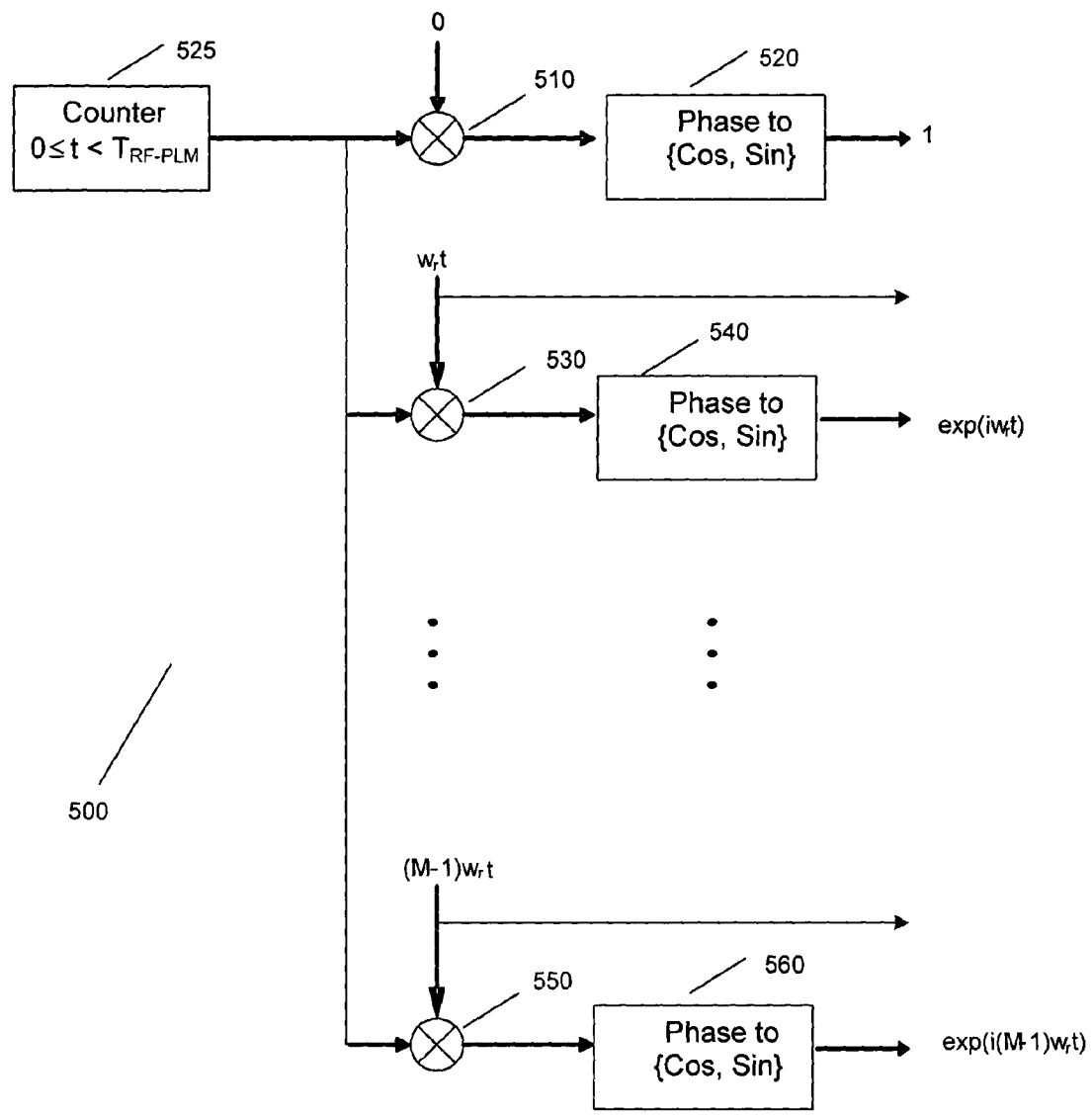
FIG. 5 is a block diagram of an exemplary orthogonal set of sequence generator and corresponding RF phase, in accordance with an embodiment of the invention.

FIG. 5 is a block diagram of an exemplary orthogonal set of sequence generator and corresponding RF phase, in accordance with an embodiment of the invention. Referring to FIG. 5, there is shown a system 500 that may correspond to a portion of the SWG set generator 126 in FIG. 1. The system 500 may comprise a counter 525, complex multipliers 510, 530, to 550, and phase converters 520, 540, to 560. The system 500 may be adapted to operate as a complex harmonic generator. The counter 525 may comprise suitable logic, circuitry, and/or code that may be adapted to generate n count values, where n=0 to N−1 and where each count value corresponds to an interval $\Delta T_{RF\text{-}PLM}$ such that $\Delta T_{RF\text{-}PLM} \times N \times W_r = 2\pi$. The counter 525 may be adapted to operate during the RF-PLM operation, that is, during the time interval described by $t_{start}(n) \le t_{start}(n) + t \le t_{start}(n) + T_{RF\text{-}PLM}$. In some instances, the counter 525 may be adapted to start the counting operation at $t_{start}(n)$.

The complex multipliers 510, 530, to 550 may comprise suitable logic, circuitry, and/or code that may be adapted to scale the count values in order to generate the appropriate phase for each of the phase-shifters 110 to 111 in FIG. 1. The phase converters 520, 530, to 560 may comprise suitable logic, circuitry, and/or code that may be adapted to convert the outputs of the complex multipliers 510, 530, to 550 into $\{\cos(w_r kt), \sin(w_r kt)\}$ values represented by $\exp(iw_r kt)$, where k=0 to M−1. The $\{\cos(w_r kt), \sin(w_r kt)\}$ values may be synchronized to the operation of the counter 525 via a signal, such as a clock signal. In another embodiment of the invention, a read only memory (ROM), for example, may be utilized to store the $\{\cos(w_r kt), \sin(w_r kt)\}$ values and the counter output may represent the addresses in the ROM.

Figure 6:
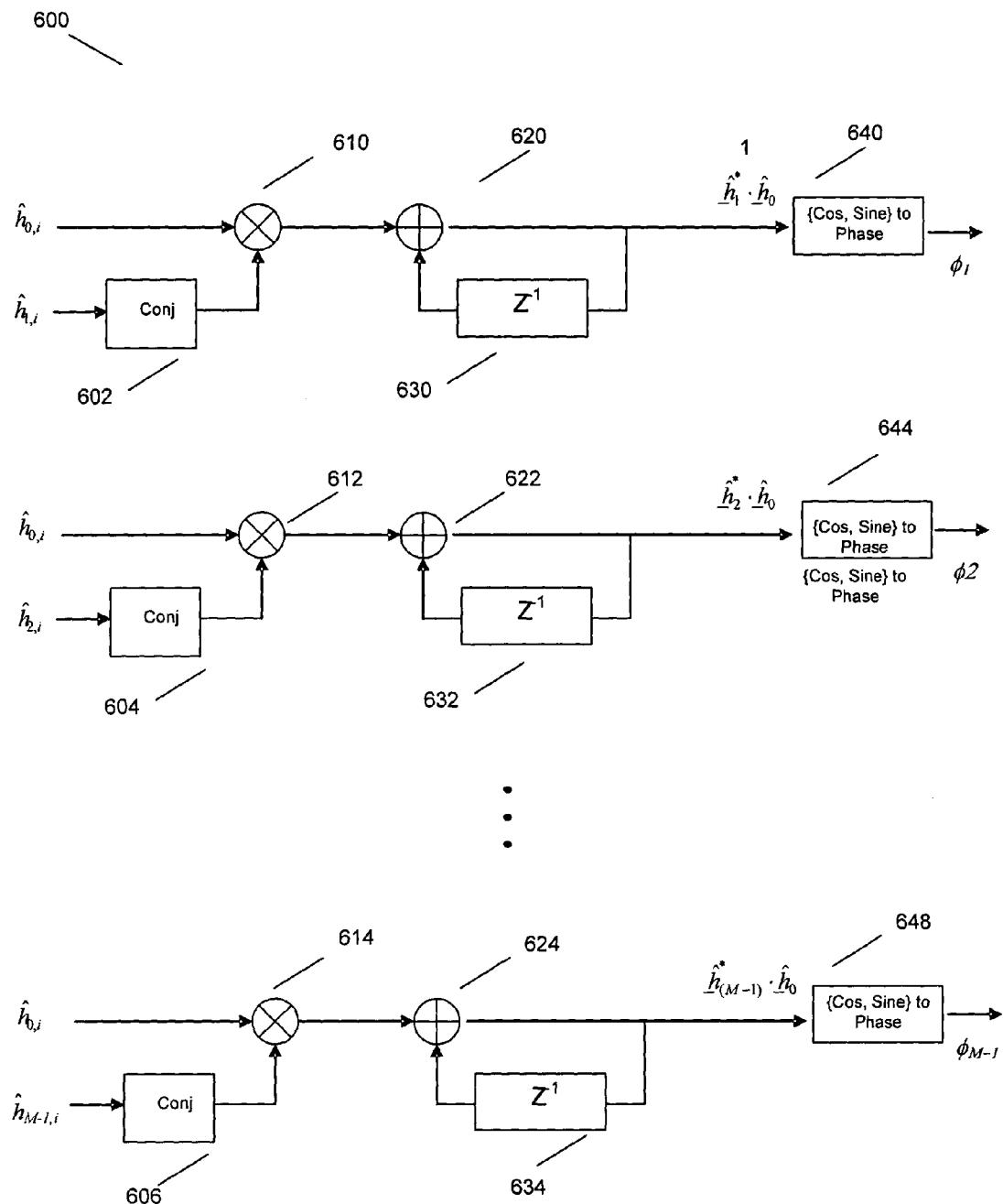
FIG. 6 is a block diagram of exemplary phase estimates, in accordance with an embodiment of the invention.

FIG. 6 is a block diagram of exemplary phase estimates, in accordance with an embodiment of the invention. Referring to FIG. 6, there is shown a system 600 that may correspond to a portion of the SWG algorithm 124 in FIG. 1. The system 600 may comprise complex conjugate block 602, 606, to 606, complex multipliers 610, 612, to 614, adders 620, 622, to 624, registers 630, 632, to 634, and phase converters 640, 644, to 648. The system 600 may be adapted to generate phase estimates that may be applied to the phase-shifters 110 to 111.

The complex conjugate blocks 602, 606, to 606 may comprise suitable logic, circuitry, and/or code that may be adapted to generate the complex conjugate of the inputs $\hat{h}_{k,i}$, where k=1 to M−1 and i=0 to L−1. The complex multipliers 610, 612, to 614 may comprise suitable logic, circuitry, and/or code that may be adapted to multiply the complex conjugates generated by the complex conjugate block 602, 606, to 606 with $\hat{h}_{0,i}$, where i=0 to L−1. In this regard, $\hat{h}_{0,i}$ may be utilized as a reference.

The adders 620, 622, to 624 may comprise suitable logic, circuitry, and/or code that may be adapted to accumulate the output of the complex multipliers 610, 612, to 614. The registers 630, 632, to 634 may comprise suitable logic, circuitry, and/or code that may be adapted to store a current sum generated by the adders 620, 622, to 624 and may be feed back the stored current sum to the adders 620, 622, to 624 after a delay. The phase converters 640, 644, to 648 may comprise suitable logic, circuitry, and/or code that may be adapted to convert the outputs of the adders 620, 622, to 624 to phase values that may be transferred to the phase-shifters 110 to 111. In this regard, the phase converters 640, 644, to 648 may generate a value for a receive antenna k given by the expression $\phi_k = \text{Arg}(\hat{h}_k^* \cdot \hat{h}_0)$, where k=1 to M−1, the operation Arg(x) corresponds to the argument of x, the operation ($\cdot$) corresponds to the inner product, and * corresponds to the complex conjugate.

Another embodiment of the invention may provide a machine-readable storage, having stored thereon, a computer program having at least one code section executable by a machine, thereby causing the machine to perform the steps for achieving channel estimation in a SC SIMO system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling wireless communication, the method comprising:
   generating an orthogonal function sequence during a radio frequency phase learning mode (RF-PLM) operation portion of a transmit time interval (TTI);
   modifying signals received by a plurality of receive antennas in a wireless communication system during said RF-PLM operation portion of said TTI based on said generated orthogonal function sequence;
   generating a baseband combined channel estimate during said RF-PLM operation portion of said TTI based on said modified signals;
   generating a plurality of channel estimates during a remaining portion of said TTI based on said generated baseband combined channel estimate and said generated orthogonal function sequence; and generating a plurality of phase values to apply to said plurality of receive antennas during said remaining portion of said TTI based on said generated plurality of channel estimates.

2. The method according to claim 1, comprising delaying said generated orthogonal function sequence by a delay interval when generating said plurality of channel estimates.

3. The method according to claim 2, comprising selecting said delay interval.

4. The method according to claim 1, comprising selecting said orthogonal function sequence from a plurality of orthogonal function sequences.

5. The method according to claim 1, comprising selecting a time interval for said RF-PLM operation portion of said TTI.

6. The method according to claim 1, comprising generating a plurality of counter values when generating said orthogonal function sequence.

7. The method according to claim 1, comprising generating said baseband combined channel estimate for a plurality of cluster paths.

8. The method according to claim 1, comprising generating said plurality of channel estimates for a plurality of cluster paths.

* * * * *